Feb. 24, 1970     S. L. JENKINS     3,496,858

METHOD FOR PREPARING A PROTEIN PRODUCT

Filed Dec. 9, 1966

INVENTOR.
SHERMAN L. JENKINS

BY

ATTORNEYS

United States Patent Office 3,496,858
Patented Feb. 24, 1970

3,496,858
METHOD FOR PREPARING A PROTEIN PRODUCT
Sherman L. Jenkins, Ava, Mo., assignor to Ralston Purina Company, St. Louis, Mo., a corporation of Missouri
Continuation-in-part of application Ser. No. 514,041, Dec. 15, 1965. This application Dec. 9, 1966, Ser. No. 600,419
Int. Cl. A23j 1/14
U.S. Cl. 99—17                    11 Claims

ABSTRACT OF THE DISCLOSURE

A method of preparing an expanded protein food product somewhat resembling meat directly from soybean meal itself, which utilizes soybean meal that has substantially all the fat or oil removed. A predetermined proportion of sulfur or sulfur compounds is added to the soybean meal and this mixture is then aqueously moistened. The moistened soybean meal mixture is agitated, heated and pressurized in an extruder chamber to cause conversion of the meal to a flowable substance which is forced through restricted orifice means into a zone of lower temperature and pressure, normally atmospheric to obtain an expanded food product stable in water.

---

This is a continuation-in-part application of copending patent application entitled Method for Preparing a Protein Product, filed Dec. 15, 1965, Ser. No. 514,041 now abandoned.

This invention relates to a method of forming a protein food product, particularly a meat simulating food product, from protein-containing vegetable materials, particular soybean meal, and relates to a meat simulating product produced from protein-containing vegetable materials.

In recent years, Ronald J. Flier, a co-worker of the inventor herein, conceived and developed a unique method of producing a novel meat simulating food product from relatively inexpensive protein-containing vegetable materials. This concept is set forth in copending patent application Ser. No. 381,853, entitled Protein Product, filed July 10, 1964, now abandoned, and its continuation-in-part application entitled Protein Product and Method and Apparatus for Forming Same, filed Dec. 9, 1966, Ser. No. 600,471. This present invention is an improvement over the basic invention set forth therein. The product produced by the Flier method, especially as produced on the novel Flier apparatus, exhibits excellent characteristics and can be produced at a relatively low cost. In adapting the Flier concept to a mass production basis, the inventor herein sought to improve the concept so that the production cost could be cut even further, and so that the process would have more flexibility in operating criteria, while still resulting in an excellent product.

A resulting discovery occurred which achieves not only these advantages, but even further advantages as well.

It is a primary object of this invention therefore to provide an improved method of preparing a protein meat-like food product from a protein-containing vegetable material.

Another object of this invention is to provide an improved method of treating soybean meal under elevated temperatures and pressures to provide a food product having appearance, physical structure and texture, chewing characteristics, and nutritional value comparable in some respects to those of meat.

Another object of this invention is to provide an improvement of the Flier method of producing a fibrous, expanded simulated meat product from protein-containing vegetable materials, capable of higher production output at a relatively less cost, requiring less power to operate the extrusion equipment, capable of dependable production operation over a wider range of process variables, capable of producing a high quality product from a soybean meal having a wider useful range of moisture content and protein content, and yet without requiring the special Flier extruder for optimum results.

More specifically, it is an object of this invention to improve the method of treating soybean meal to prepare an extruded food product by the addition of certain preconditioning reagents to the soybean meal and thereby causing unique chemical and physical reactions in the extruder.

These and other objects of this invention will become apparent upon studying the following specification in conjunction with the drawings in which.

Figure 1:
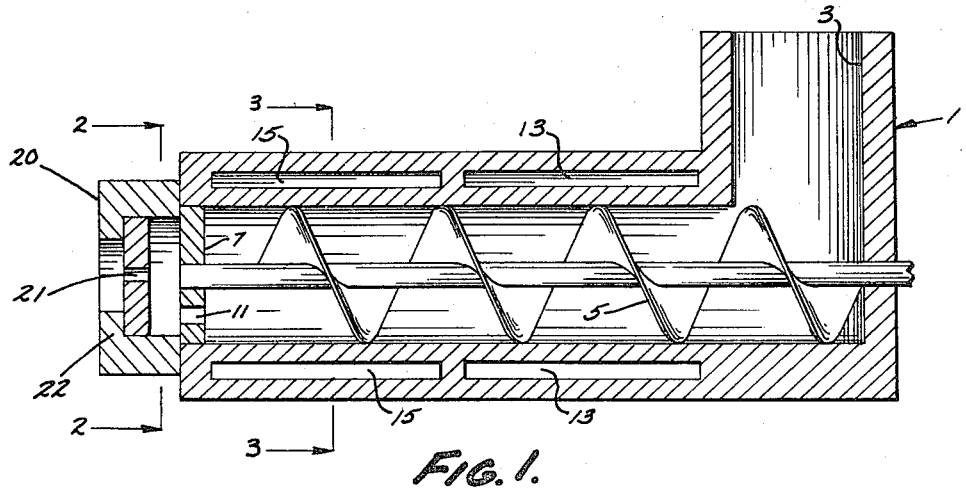
FIG. 1 is a side elevational sectional view of an extruder assembly usable for practicing this invention.

The concept of this invention pertains broadly to a novel processing treatment of a protein-containing vegetable material to obtain a meat simulating food product having an excellent fiber as stated previously.

The basic process for doing this, and described in copending application Ser. No. 381,853, now abandoned although producing an excellent product, does have limited ranges of operating criteria and composition components, from a practical standpoint, if top quality product is to be produced. In adapting this basic process to a mass production scale, therefore, these practical limitations do present operational handicaps. To eliminate these production handicaps, a discovery was made that certain specific chemical reagents, when added to the soybean meal prior to extrusion, had remarkable beneficial effects. Specifically, the improved process resulted in excellent quality fibrous structure and product porosity, even though the moisture content was varied outside the previous practical range, the protein concentration was varied outside the previous practical range, the special Flier extruder assembly was not used, and the equipment required less power to operate. Further, the product expanded to a larger size when emitted from the extruder die outlet which must by necessity be restricted.

The initial breakthrough in this discovery involved the addition of a minute amount of elemental sulfur to the soybean meal prior to extrusion. Following this discovery, an extensive number of experimental operational runs were conducted on dozens of various potential additives, including a great many chemical reagents comprising sulfur compounds. Of all of these, it was discovered that a select few, namely sulfur, potassium sulfide, and sodium sulfide had a particularly advantageous beneficial result. Extensive experimentation has shown that of the three particular sulfur type reagents of elemental sulfur, potassium sulfide and sodium sulfide, by far the most effective is elemental sulfur, with the second most effective being potassium sulfide, and the third most effective being sodium sulfide. The potassium sulfide produces a product which is considerably better than the sodium sulfide, with the elemental sulfur producing a product which is far better than either of the other two. Various combinations of these reagents and possible chemical intermediates along the chemical reduction sequence between sulfur and the sulfides could be employed.

It is believed that, with the addition of one of these reagents to the soybean meal, even in a minute amount, prior to extrusion, under the elevated temperatures and pressures of the extruder, the extruded materials undergo certain chemical changes that result in very advantageous physical characteristics of an expanded, fibrous food product.

An exact and complete technical explanation cannot be given because of the very complex nature of the protein molecules in the soybean meal, and of the inability to completely analyze the changes in the molecular structure of the products. It is believed however, that these particular sulfur type reagents, under the influence of the high temperatures and pressures in the extruder, cause molecular changes to occur in the elongated curled protein molecules by alteration of the crystine bonds formed by amino acid groups between the peptide chains which are generally parallel and overlapping. These reagents have a profound effect upon this molecular structure, causing apparent breakdown and reorganization from the original molecular formation into an extremely desirable fibrous characteristic, when the product expands as it exits from the restricted extruder outlet. The sodium sulfide reagent does cause strong odors during processing, making it far less desirable as an additive.

As noted, only minute amounts of the reagents need be used. It has been determined from experimentation that the sulfur should be present to an extent of about 100 parts per million of the soybean meal, by weight. A practical range is 100 parts per million to 5000 parts per million, i.e. about 0.01% to 0.5% by weight of the soybean meal. Additional sulfur above this amount does not seem to have any further beneficial effects, and should not be employed in greater amounts.

If potassium sulfide is employed as the reagent, it is preferably used in greater concentrations than the elemental sulfur, usually in a ratio of about 4 to 1 relative to elemental sulfur, so that a minimum amount of about 400 parts per million should be used. A practical range is 400 to 20,000 parts per million. Even so, potassium sulfide is not as effective as sulfur in that the final product resulting when potassium sulfide is used is inferior in fibrous structure and expansion rate, although it causes a substantial improvement over extruded control samples of soybean meal with no such additive used.

If sodium sulfide is employed, it is used in still greater concentrations, i.e. about 10 to 1 relative to sulfur, so that a practical minimum of about 1000 parts per million should be used. Even so, the resulting product is inferior to that of the product resulting from the potassium sulfide or the sulfur additives. In addition, the sodium sulfide additive has a further disadvantage with respect to the other two additives, in that a substantial odor occurs during processing apparently due to some chemical reaction creating mercaptan type materials during processing. Hence, this additive is less desirable.

To obtain uniform distribtuion of the small amount of special reagent in the soybean meal, the reagent is preferably added to the soybean meal by being first dispersed uniformly throughout the aqueous liquid which is subsequently used to raise the moisture content of the soybean meal to within an acceptable range.

The soybean meal used as the starting material in this process is the product resulting after oil is extratced from comminuted soybeans. It is usually in a flake type particulate form, although it could be ground into a finer form such as a powder. These various physical sizes and configurations are considered to be broadly within the term "soybean meal" when used wherein. In order to practice the invention, the oil should be extracted by chemical solvent techniques, such as with hexane, rather than by mechanical pressing techniques. If mechanical pressing is used, the meal must be treated by oil solvent extraction prior to extrusion. This is necessary because the meal fed to the extruder should be substantially free of oil. That is, it should contain about 0.5% or less by weight of oil for top quality product. It has been determined that the oil content can range up into minor amounts of about 2% by weight, but in amounts greater than this and approaching about 5% by weight, the extruded product exhibits practically on fibrous structure at all. Further, no other vegetable or animal oil or fats should be added to the soybean meal prior to extrusion. When used herein, the terms "oil" and "fat" are intended to be generally synonymous, even though oil is normally thought of as a liquid and fat as a solid.

In addition to control of the oil or fat content, any added carbohydrate content of the soybean meal should normally not be greater than about 5% by weight of the meal. Although the expansion of the product is important in order to obtain a fibrous structure, excessive expansion caused by excess carbohydrate can destroy or seriously limit the formation of the specal interlaced fibrous structure.

As stated previously, moisture is added to the soybean meal prior to extrusion because the residual moisture content of the meal after oil extraction is normally very low. The moisture content must be controlled within an operative range. By employing the special additives, the operative moisture content range can be broadened without sacrificing production of top quality product. Specifically, the top quality product will result anywhere within the moisture range of about 19% to 41% by weight of the resulting moisture and meal mixture, although useful products outside the below stated moisture range can be obtained. This broad range of about 22% is in contrast to a narrow 10% minimum to maximum range variation when the additive is not employed. Prior to adding the water, as stated above, the reagent is preferably suspended (and partially dissolved) in it. Uniform suspension is maintained until use.

Another significant characteristic of the soybean meal to be controlled is its protein content. Typically, soybean meal resulting from conventional oil extraction processes has a protein content of about 44% by weight. Sometimes, this protein content is purposely increased to approximately 50% by weight or above by further refining or the addition of a protein concentrate such as that commercially termed "isolated protein." The protein content actually can be increased still further if it is desired to produce a high protein food, for example for health foods or the like. Without using the special additives, the range of protein content should be carefully controlled since, if it falls low, fiber formation falls off rapidly, and if it is increased to a high percentage, the product tends to become gummy. When the special additives noted are employed in this process, however, the protein content can be varied over a wide range of 35% to 75% and still obtain a top quality product. By enabling this wide range to be used in a practical fashion, the potential of the food products which can be produced by the method is greatly increased.

Figure 2:
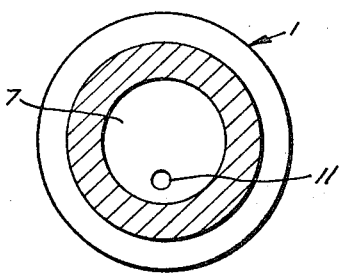
FIG. 2 is a sectional view of the apparatus in FIG. 1, taken on plane II—II.
Figure 3:
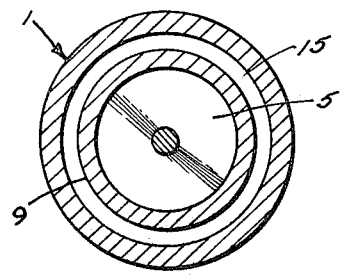
FIG. 3 is a sectional view of the apparatus in FIG. 1, taken on III—III.
Figure 4:
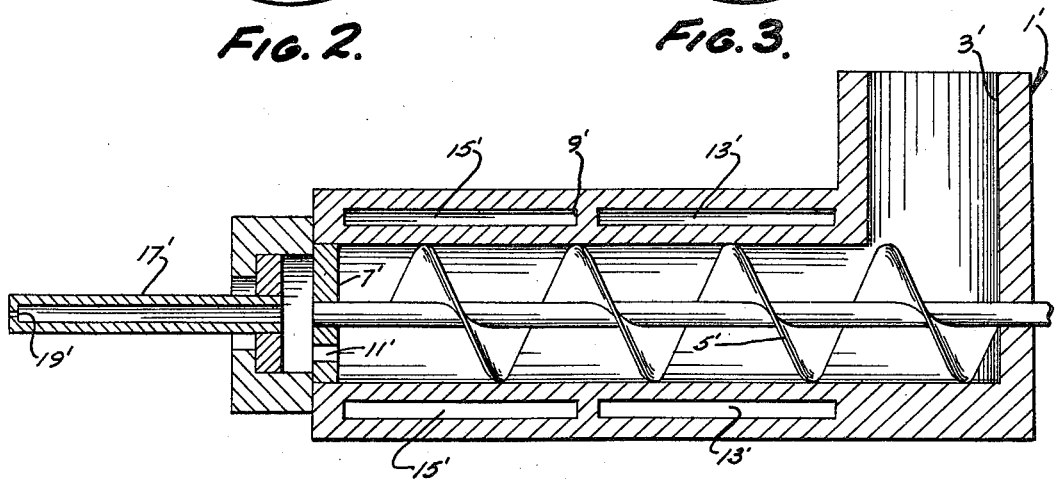
FIG. 4 is a side elevational sectional view of a modified form of extruder apparatus which could be used for practicing the invention herein if desired.

When a soybean meal mixture has been prepared as disclosed above, it is then fed into the extruder assembly. In the extruder assembly, if the mixture with the special additive is employed, no special tube extension needs to be employed at the extruder outlet for the high quality product. Thus, although such an extruder structure as is shown in FIG. 4 can be employed, the simpler extruder structure shown in FIGS. 1 through 3 can be just as readily used.

The extruder assembly 1 basically comprises a housing body 9 of generally elongated configuration with a meal mixture inlet 3 on one end of the housing, a rotationally driven pressure screw 5 extending through an elongated cylindrical extruder chamber in the housing, and product outlet means on the end of the housing opposite the inlet. The outlet means is provided and controlled in a special fashion to prevent premature ejection of the product prior to formation of the fibrous structure. Specifically, a restrictor or retention pressure plate 7 closes off the end of the extruder chamber, except that it has restricted port means such as one or more small orifices 11 therein. This orifice means may be of any selected configuration, but normally is circular. If only one orifice is employed, it normally has a diameter of about ¼ inch or so. If more than one is used, the diameter of each is smaller so that the total cross sectional area of the orifices is approximately the same. It has been found in actual operation that the specific size of the outlet can be varied somewhat within fractions of an inch. The actual optimum size for a particular extruder construction can be readily determined by the substitution of a few different sizes on a trial and error basis. The rotating screw, in combination with this restrainer plate and its restricted outlet, creates a high pressure on the material in the extruder so that the particulate moist material fed into it changes under the elevated pressure and temperature into a form which flows in a generally fluid manner.

The pressures in the extruder are elevated to several hundreds pounds per square inch or more, and are believed to normally fall within the range of about 300 to 600 p.s.i.g. Part of the pressure is caused by the screw and retainer plate combination, and part is due to the high temperatures which result both from the friction between the flowing products and the components of the extruder, and from external heat that is purposely added to the outside of the extruder during operation. This added heat is obtained for example by passing steam through the forward or front annular jacket 15 within the extruder housing and around the chamber but separated from it. The amount of heat applied is controlled for example by typical valving techniques in order to obtain temperatures which are not sufficiently high to cause the product to scorch or burn, but which are sufficiently high to cause the desired chemical and physical reactions within the material. Although the amount of heat to accomplish this will vary with a particular extruder construction, it can be readily determined by trial and error.

The temperatures reached by the material in the extruder must be above 212° F. and actually should be considerably higher, within a certain specific range, in order for a meat simulating product with good fibrous structure to be formed. This temperature varies with variations of the other mixture characteristics of which the most significant is moisture, but normally shall be between 270° and 310° F. As the moisture content increases from about 20% to about 40%, the temperatures may decrease from about 310° F. to about 270° F.

In addition to the steam jacket for adding heat, an annular cooling jacket 13 surrounds the rear portion of the extruder chamber. In normal operation, it has been found desirable to maintain lower temperatures in the initial stages of the extruder to prevent the product from overheating before it exits and yet to enable sufficient heat to be added in the latter stages of the extruder to cause proper fiber formation. Again, the amount of cooling water and its temperature to cause the desired cooling effect will vary, but can be readily determined by trial and error.

The product outlet means from the extruder also includes a smaller secondary chamber into which the material discharges from restricted orifice 11. The output from this smaller chamber is restricted also by a die plate 20, containing a restricted outlet 21. This plate, which can be supported by a suitable retention collar 22 or the like, provides the second stage of a double stage restriction set up, the first stage being achieved by restrictor plate 11. This double stage restriction has been found necessary to obtain top quality fibrous formation in the product.

However, when employing the special additives, it is not necessary to utilize an elongated tubular extension 17' as shown on the modified extruder assembly 1' in FIG. 4. This modified, but more complex extruder structure, which preferably is employed when practicing the basic invention set forth in the above identified Flier application, includes an inlet 3', a screw 5', an extruder housing 9', a front steam jacket 15', rear cooling water jacket 15', a restrictor plate 7' with a restricted outlet 11', and a restricted die nozzle outlet 19' at the end of tube 17'.

OPERATION

In operation, the soybean meal obtained by solvent extraction of oil is checked so that it has at most only a minor oil content, i.e. about 2% by weight or less, and preferably is substantially oil free, i.e. about 0.5% by weight or less of the soybean meal. If the content is greater than this, the soybean meal must be treated with a chemical solvent such as hexane to extract the excess oil. Further, no other oil or fat material, animal or vegetable, is added to the meal prior to extrusion.

The selected amount of special additive is then added to the soybean meal as by adding it to the aqueous liquid to be employed for moistening the soybean meal, normally by suspending it. Efforts should be taken to maintain a uniform homogeneous suspension of the additive within the water until its use.

The aqueous liquid containing the additive is then mixed with the soybean meal to bring its moisture content within the acceptable range. The mixture is agitated until a homogeneous mixture is obtained.

The mixture is then fed into inlet 3 of the extruder, while screw 5 is rotated at a substantial speed, steam is passed through jacket 15, cooling water passed through jacket 13. The meal mixture is advanced within the extruder while being heated to elevated temperatures and subjected to elevated pressures. The mechanically worked mixture becomes a viscous fluid type substance which is forced through restrictor orifice 11 after about 30 to 40 seconds retention time within the extruder, depending upon the length of the extruder, and into the supplemental chamber, from whence it flows through the second restrictor die outlet 21. As the product emerges from outlet 21, the super heated moisture contained in the substance enters the substantially lower atmospheric pressure environment where it expands by flash off evaporation of part of the moisture to expand the product into a porous structure. The evaporation also cools the product substantially. The expanded product emerging is very porous, and has a fibrous network structure somewhat resembling that of actual meat. The product can be kept moist and used directly for food materials, or can be dried relatively easily by passing it through a conventional drying chamber and then packed in a convenient fashion for later use.

The product rehydrates rapidly and completely within a few seconds, merely by adding an aqueous liquid such as plain water, with the resulting rehydrated structure having excellent food characteristics. It can be used for human foods, e.g. health foods, or, due to its inexpensiveness, can be employed for pet foods or the like. Its characteristics can be varied somewhat by varying its protein content, moisture content, the selection of the particular additive, extruding temperatures and pressures, and the like.

Typical examples of the many hundreds of runs made during the experimentation are set forth as follows.

ILLUSTRATION 1

Seventeen pounds of soybean meal having a 50% protein content and a fat content of 0.5% were mixed with 2600 cc. of water to which 0.007 pound of finely divided elemental sulfur had been added. After mixing of these materials together to obtain a homogeneous mixture, the mixture was added to the extruder, with steam at 20 p.s.i.g. circulated through jacket 15, and room temperature cooling water at 60 p.s.i.g. passed through cooling jacket 13. The orifice 11 and pressure plate 7 was ½ inch in diameter, with the orifice 21 in the die plate being ⅜ inch by ⅛ inch. The temperature of the mixture at the downstream or outlet end of the extruder reached 280° F., at a pressure of about 400 p.s.i. It was extruded through the double orifice series and ejected into the atmosphere in the form of a continuous length of expanding structure ovular in cross section with a major diameter of about 1 inch and a minor diameter of approximately ¾ inch. It had an excellent porous, fibrous structure.

ILLUSTRATION 2

Seventeen pounds of soybean meal having a protein content of about 50% was mixed with about 2600 cc. of water to which 0.028 pound of potassium sulfide had been added in suspended form. The mixture was extruded as in Illustration No. 1, with the resultant product possessing an improved puffed and fibrous meat-like texture, but with the fibrous structure not being as excellent as that obtained with elemental sulfur and with the product having an extruded size of about ½ inch by ⅝ inch. Its porosity was slightly less than that from Illustration No. 1 above.

ILLUSTRATION 3

The operative steps set forth in Illustration No. 1 were repeated except that, instead of the elemental sulfur, 0.070 pound of sodium sulfide was suspended in the water prior to addition to the meal. With the other operational factors approximately the same, the product resulting, although having an improved fibrous structure, was of lower quality than the potassium sulfide run and substantially lower quality than the sulfur run, having a resulting diameter of about ½ inch. A substantial disagreeable odor was given off during processing.

ILLUSTRATION 4

Parallel runs were made similar to Illustration No. 1, except that the sulfur content in various runs was varied between 100 and 5,000 parts per million. The products
Parallel runs were made similar to Illustration No. 1, above.

ILLUSTRATION 5

Parallel runs were made similar to Illustration No. 1 above, except that the protein content was varied between 35% and 75% by weight of the soybean meal. The product resulting was of excellent quality, good fibrous structure formation, and continuity over the length of the porous material.

ILLUSTRATION 6

Parallel runs similar to Illustration No. 1 were employed, except that the moisture content was varied between 19.3% and 41% by weight of the soybean meal mixture. Again, the results were excellent.

ILLUSTRATION 7

Parallel runs were made similar to Illustration No. 2, except that the moisture content, protein content, and amount of additive were varied over a regulated graduated basis in a manner similar to the parallel runs set forth in Illustration Nos. 4 through 6 above.

Countless additional illustrations could be recited, but it is believed that, with the above illustrations and discussion of the criteria and critical factors involved, anyone having ordinary skill in this art could adapt the novel method to various situations to obtain the desired type of product merely with a few trial and error variations in the moisture content, protein content, extrusion pressures and temperatures, restrainer plate restrictions, extrusion die nozzle sizes, and the like. Variations in these and related factors could be readily made within the concept taught, and hence the invention is intended to be limited only by the scope of the appended claims and the reasonably equivalent methods and products to those defined therein.

I claim:

1. A method of producing a porous food product from a protein-containing vegetable material, comprising the steps of: forming a mixture by adding, to a protein-containing vegetable material having a protein content of at least about 35% by weight, said protein material having an oil content of less than about 5% by weight, moisture to a content of 19–41% and an effective amount of at least about 100 p.p.m. of a sulfur type reagent capable of altering the cystine bond structure between the peptide chains of protein molecules under elevated temperatures and pressures; mechanically working the mixture under elevated temperatures of at least 212° F. and elevated pressures to convert the mixture into a flowable substance while altering said cystine bond structure; and forming an expanded, porous structure by extruding the converted mixture through restricted orifice means into an environment of substantially lower pressure.

2. A method of producing a meat simulating porous food product from soybean meal, comprising the steps of: forming a mixture of soybean meal having a protein content of at least about 35% by weight, said meal having an oil content of less than about 5% by weight, sufficient moisture, and an effective amount of at least about 100 p.p.m. of a reagent selected from the group consisting of elemental sulfur, potassium sulfide, sodium sulfide, intermediates along the chemical reduction sequence between sulfur and sulfides, and combinations thereof; mechanically working the mixture under elevated temperatures of at least 212° F. and elevated pressures to convert the mixture into a flowable substance; and forming a porous, expanded structure by extruding the converted mixture through restricted orifice means into an environment of substantially lower pressure.

3. A method of producing a meat simulating, fibrous, porous food product from soybean meal, comprising the steps of: forming a mixture of soybean meal having a protein content of at least about 35% by weight, said meal having an oil content of less than about 5% by weight, sufficient moisture, and an effective amount of at least about 100 p.p.m. of reagent selected from the group consisting of elemental sulfur, potassium sulfide, sodium sulfide, intermediates along the chemical reduction sequence between sulfur and sulfides, and combinations of the aforementioned reagents, mechanically working the mixture under elevated temperatures of at least 212° F. and elevated pressure to convert the mixture into a flowable substance; and forming the porous, expanded, fibrous structure by extruding the converted mixture through restricted orifice means into an environment of substantially lower pressure.

4. The method in claim 2 wherein said reagent is elemental sulfur.

5. The method in claim 2 wherein said reagent is potassium sulfide.

6. The method in claim 2 wherein said reagent is sodium sulfide.

7. The method in claim 4 wherein said sulfur is added in an amount of 100–5000 p.p.m., by weight, of the soybean meal.

8. The method in claim 2 wherein the mixture is extruded through a two state restricted orifice means.

9. A method of producing a meat simulating food product from soybean meal, comprising the steps of: forming a mixture of soybean having an oil content of less than about 5% by weight, sufficient moisture to form a mixture moisture content between 19% and 41% by weight, and a sulfur reagent from the group consisting of elemental sulfur, potassium sulfide, and sodium sulfide; mechanically working the mixture under an elevated pressure and at a temperature above 212° F. to convert the mixture into a flowable substance; and forming a porous, expanded, fibrous structure by extruding the converted mixture through two stage restricted orifice means, into an environment of substantially lower pressure.

10. The method in claim 9 wherein said reagent is elemental sulfur.

11. The method in claim 9 wherein said reagent is potassium sulfide.

References Cited

UNITED STATES PATENTS

| | | | |
|---|---|---|---|
| 3,102,031 | 8/1963 | MacAllister et al. | 99—14 |
| 3,118,959 | 1/1964 | Westeen et al. | 99—14 XR |
| 3,268,336 | 8/1966 | Hale et al. | 99—82 XR |

OTHER REFERENCES

Altschul et al., Processed Plant Proteins Foodstuffs, New York, 1958, pp. 402 to 464, Academic Press Inc.

M. W. GREENSTEIN, Primary Examiner

H. H. KLARE III, Assistant Examiner

U.S. Cl. X.R.

99—14, 81

PO-1050
(5/69)

UNITED STATES PATENT OFFICE
CERTIFICATE OF CORRECTION

Patent No. 3,496,858    Dated February 24, 1970

Inventor(s) Sherman L. Jenkins

It is certified that error appears in the above-identified patent and that said Letters Patent are hereby corrected as shown below:

Column 7, lines 40 and 41 - delete and substitute --- resulting were excellent, comparable to Illustration No. 1 above.---

Column 3, line 16 - "crystine" should read as "cystine"

Column 3, line 69 - "wherein" should read as "herein"

Column 4, line 6 - "on" should read as "no"

Column 6, line 74 - "bein" should read as "being"

SIGNED AND SEALED
SEP 29 1970

(SEAL)
Attest:

Edward M. Fletcher, Jr.
Attesting Officer

WILLIAM E. SCHUYLER, JR.
Commissioner of Patents